Nov. 1, 1966

R. H. MESEROLE ETAL 3,282,011

THERMAL INSULATING STRUCTURE

Filed April 25, 1962

INVENTORS:
ROBERT H. MESEROLE
RICHARD E. SLACK
RAYMOND E. SMITH
JOSEPH J. VERDINE

BY

*John A. McKinney*

ATTORNEY

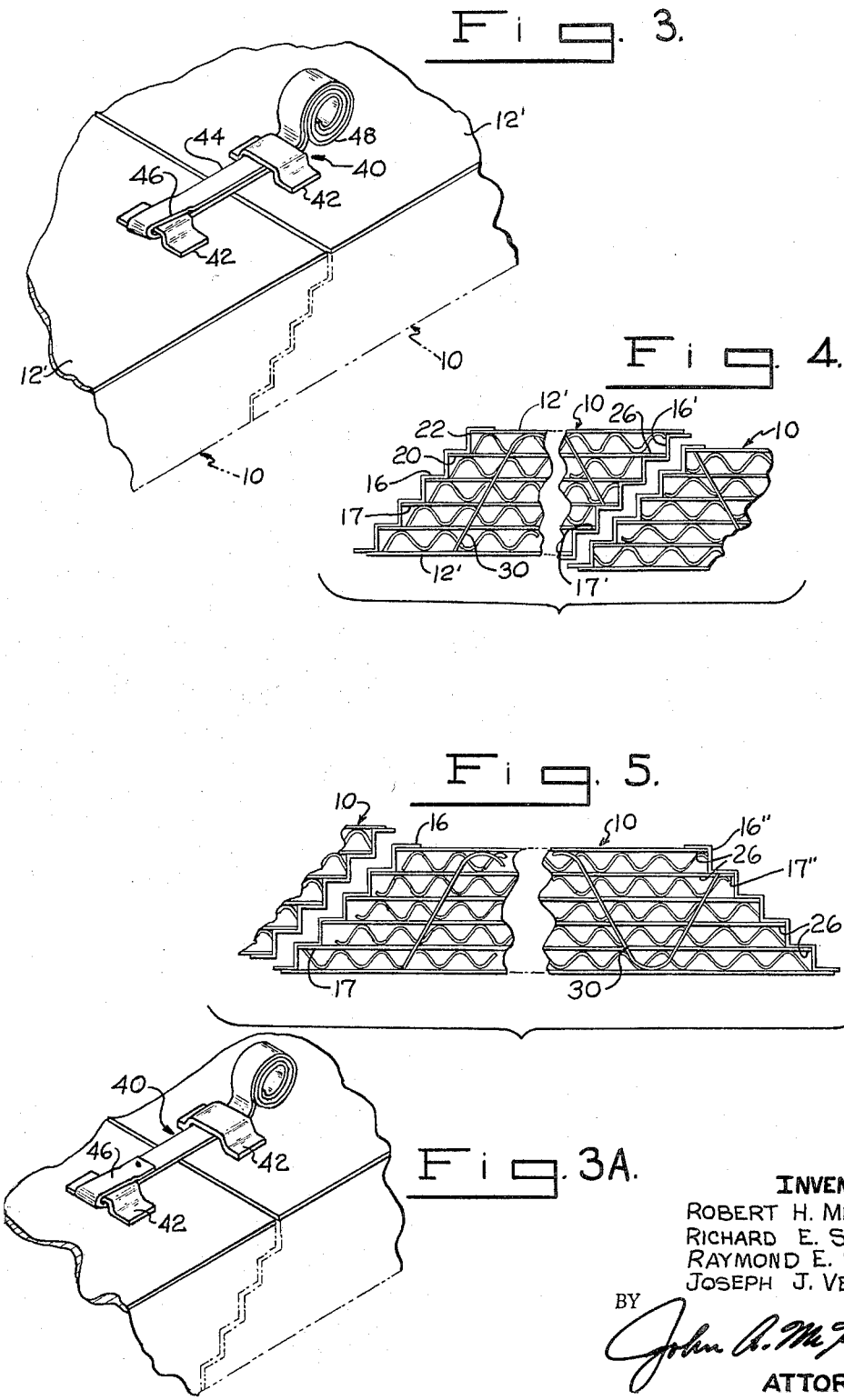

Nov. 1, 1966  R. H. MESEROLE ETAL  3,282,011
THERMAL INSULATING STRUCTURE
Filed April 25, 1962  3 Sheets-Sheet 3
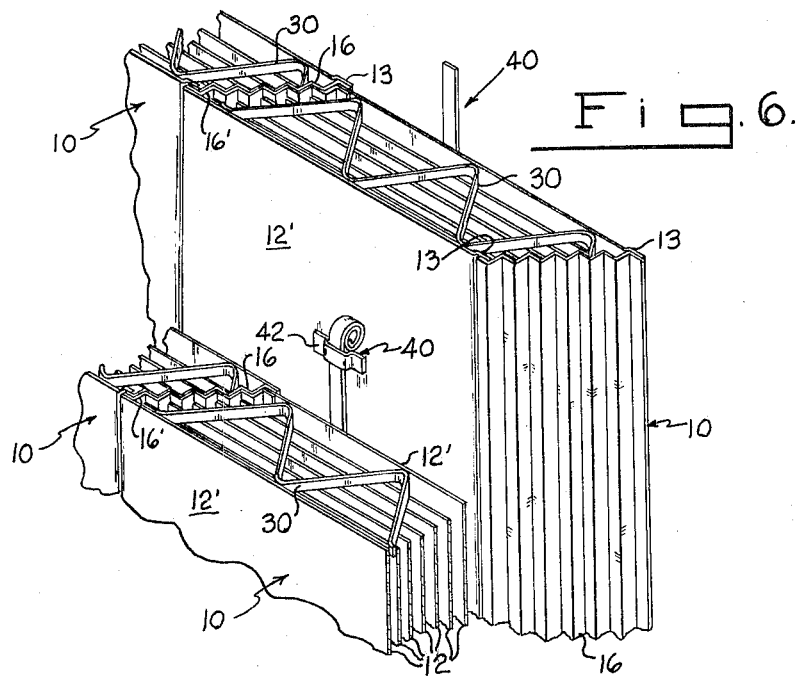
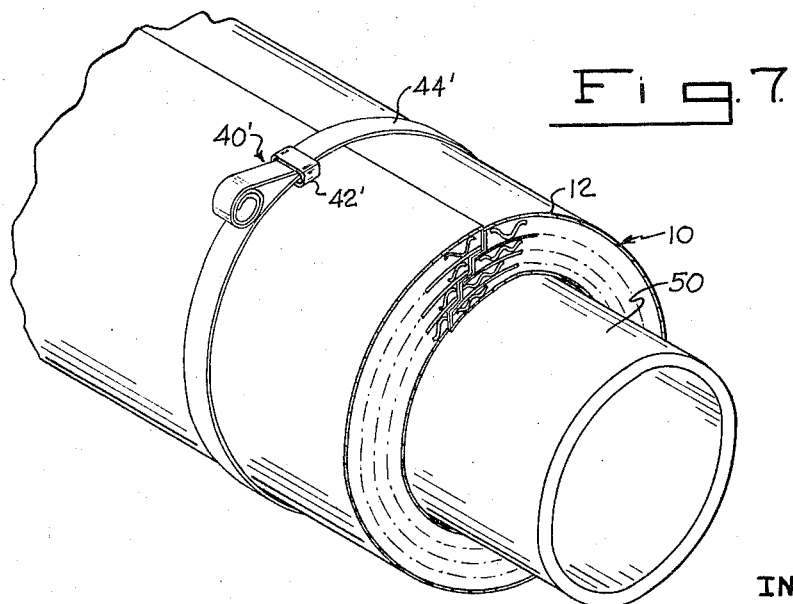
INVENTORS:
ROBERT H. MESEROLE
RICHARD E. SLACK
RAYMOND E. SMITH
JOSEPH J. VERDINE
BY John A. McKinney
ATTORNEY United States Patent Office 3,282,011
Patented Nov. 1, 1966

3,282,011
THERMAL INSULATING STRUCTURE
Robert H. Meserole, Middlesex, Richard E. Slack, South Plainfield, Raymond E. Smith, Whitehouse, and Joseph J. Verdine, Bernardsville, N.J., assignors to Johns-Manville Corporation, New York, N.Y., a corporation of New York
Filed Apr. 25, 1962, Ser. No. 190,051
5 Claims. (Cl. 52—573)

This invention relates generally to thermal insulation, and is particularly, though not exclusively, concerned with improvements in metallic insulations for deterring heat transfer, primarily radiant heat, in installations which are normally subject to adverse conditions, i.e., high pressures, corrosive fluids, contamination by circulating fluid or which contaminate the circulating fluid, etc.

The invention is adapted for use with a variety of structures where internal insulation is desirable, such as thermal and/or chemical reaction systems. However, the invention also finds utility in certain external insulation requirements.

The invention is particularly adapted for use with thermal reactor systems which are subjected to high temperatures, in the range of 400–1000° F. However, certain embodiments may be subjected to temperatures as high as 2300° F. Such heat, together with pressure changes and the corrosive nature of the transmitted fluids, is conducive to extremely rapid oxidation, deformation, corrosion and ultimate destruction of the walls defining the vessel and the conduits in connection therewith.

Some chemical reactions are accompanied by pressure shocks which, in the presence of great heat release, dictate that the walls of the reaction chambers be fabricated of relatively thick plates. Other reactions are also accompanied by release of particles which become entrapped and/or otherwise contaminate the system so that it becomes necessary to periodically decontaminate the system by flooding with liquid.

Various attempts have been made to develop insulation to primarily deter radiant heat transfer and which possesses the properties requisite for high temperature service, resistance to corrosion by fluids, particularly gases, and responsiveness to thermal and pressure shocks without loss of effectiveness. However, known insulations for this purpose have not exhibited all the desired combined properties of: unitized but resilient, facile and economical construction; flexibility under thermal and pressure shocks; resistance to ablation and particulate entrainment by a fluid stream; and reduced thermal conduction.

It will be readily apparent that pulverulent, granular, fibrous, or other conventional low conductivity materials which are susceptible to ablation are unsuitable for internally insulating chemical and/or thermal reactor systems, and the like, where particulate entrainment would contaminate the system and/or cause adverse reaction.

Parallel partitions to subdivide a space into layers have been heretofore suggested to reduce heat loss by radiation. However such previously suggested devices have been rigidly mounted on the surface being insulated and/or rely upon the flow of a permeating fluid over the cooler surface of the subdivided insulating body and removing the fluid from the warmer surface thereof. Obviously considerable heat will be lost to the permeating fluid. Furthermore, the rigidly fixed arrangement of the partitions expose them to rupture and consequent destruction when employed to insulate walls subjected to pressure shocks.

In the commonly assigned application, Serial No. 31,701, filed May 25, 1960, of Jack D. Verschoor, entitled "Thermal Insulating Structure," now abandoned, it is suggested to provide an insulating medium comprising a plurality of heat reflective members spaced by separators having definite and defined configuration, such as knitted metal mesh, which separators are slidable in relation to the adjacent shields and which yieldably maintain the shields in spaced relation.

In the co-pending, commonly assigned application, Serial No. 31,702, filed May 25, 1960 of Donald P. Rutter et al., entitled "All Metallic Insulation," it is suggested to provide a plurality of metallic heat reflective shields arranged in parallel layers with protuberances extending between the layers to define separating means which permit the shields to move in respect to each other without rupture or loss of effectiveness.

While the insulating medium of this invention may incorporate some of the features disclosed in the aforementioned Verschoor and Rutter et al. applications, the primary mode of separation is distinguishable from those disclosed in said aforementioned applications in certain respects.

It is the contemplation of this invention to provide a unitized all metallic thermal insulating panel embodying a particularly facile and economical construction wherein the shields of a particular panel are interconnected but yet are sufficiently responsive to thermal and pressure changes to resist rupture. It is the further contemplation of this invention to provide a construction which particularly facilitates interconnecting adjacent panel ends. In the aforementioned co-pending and commonly assigned applications, the individual shields of a panel unit are slidable with respect to each other. In the unitized panel contemplated by this invention the individual shields are interconnected in a manner which maintains the generally parallel arrangement but yet permits limited movement. It is a particular feature of this invention to provide an arrangement wherein adjacent panels are sufficiently responsive to thermal and pressure shocks to deter destruction and which maintain sealing engagement through mating portions.

It is accordingly an object of this invention to provide a new and improved thermal insulating panel which will withstand pressure and thermal changes without destruction of its integrity.

Another object of this invention is to provide a thermal insulating wall covering which is responsive to pressure and thermal changes and correspondingly expands and contracts according to the change taking place.

A further object of this invention is to provide insulating media which are not deleteriously affected by chemical and/or thermal reactions.

The foregoing objects and other ancillary thereto are preferably accomplished, in brief, as follows:

According to a preferred embodiment of this invention, a plurality of metallic heat reflective shields are arranged in generally parallel relation, one to another, and to the wall to be insulated. A metal connector of step formation has a peripheral side of each of the shields, comprising a panel, secured to a step of the step formation to thereby space the plural shields from each other but yet form an integral unit. Flexible fastening means are mounted to one of the outermost shields comprising a panel for connecting the panel to an adjacent panel or to other adjacent support structure. In those panels which are to be positioned vertically, the longitudinal length of the steps extend in a generally vertical direction and laterally away from the wall to be insulated. The fastening means preferably comprises a first loop member attached to the outermost shield of one of two adjacent panels; a corresponding loop member attached to the outermost sheet of the other of said two adjacent panels; and a flexible band resiliently attached to one of said first and corresponding loop members and threaded through the other loop member, said band being secured to the other loop member with securing means formed by rolling back the threaded end of the band.

Further objects and advantages of this invention will appear from the following description of species thereof and from the accompanying drawings.

FIG. 3 is an enlarged schematic pictorial view disclosing the preferred securing means connecting two adjacent panel ends;

FIG. 3A is a fragmentary view illustrating an alternate mode of fastening the securing means to the panel ends;

FIG. 4 is an end elevational view showing the panel step formation, with the steps at opposite ends of a single panel extending in the same general direction;

FIG. 5 is a view, similar to FIG. 4, showing the steps at opposite ends of a single panel extending in opposite directions;

FIG. 6 is a pictorial fragmentary view showing a manner of securing the panels to a wall; and FIG. 7 is a pictorial schematic view showing a single panel wrapped around a pipe.

Figure 2:
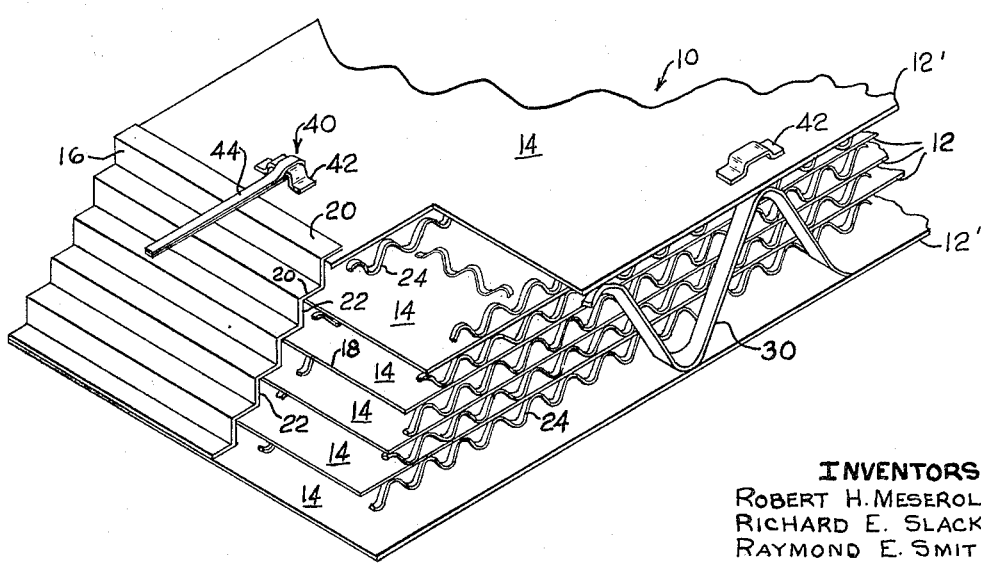
FIG. 2 is a pictorial fragmentary view of an individual panel with a portion "broken away"

Referring to FIG. 2, the insulating panel, generally designated by the numeral 10, incorporates a plurality of heat reflective shield members 12, which are preferably in the form of metallic foil, such as polished aluminum or stainless steel. The shield surfaces 14 preferably have high termal reflectivity and low thermal emissivity properties. The reflectivity is preferably in the order of .5 to 1.0.

The plurality of shields 12 are secured, as by welding, to a connector member 16 to provide a unitized panel 10. The connector member 16 is of step formation for reasons hereinafter described. As shown, a peripheral side 18 of each shield 12 is secured to a step 20 of member 16. Accordingly, the rise 22 of each step is equal to the preferred spacing between shields 12. Additional separators, such as corrugated strips 24, may be employed to provide further but resilient support between shields 12 particularly where the span of the shields is so great that the shield members may tend to flex. These additional spacers may also be in the forms as disclosed in the aforementioned Verschoor and Rutter et al. applications. It is preferred to have the span of shield members 12 sufficiently great in respect to their thickness so that they may flex in response to any thermal or pressure changes without destroying the integrity of the panel 10.

The opposite peripheral sides 26 of the shields 12 may also be secured to a connector member 16′, in the manner as shown in FIG. 4, or to a connector member 16″ as shown in FIG. 5. In FIG. 4 the shields 12 extend from the underside of the steps 17 of member 16 to the top side of the steps 17′ of member 16′. In FIG. 5 the shields 12 extend from the underside of the steps 17 of member 16 to the underside of the steps 17″ of member 16″. The embodiment shown in FIG. 4 provides an advantage in that all of shield widths spanning the space between connector members 16 may be equal and hence require less tooling and time to fabricate.

The combination of the stepped connectors 16 with the plurality of shields 12 and separators 24 provides a strong unitized heat resilient panel construction whereby the shields are held generally taut. However, the shields are sufficiently resilient to flex with explosions or implosions. Additional strength may be imparted to the panel unit by extending the length of the outermost shield members 12′ beyond the edges of the intermediate shields 12 and interconnecting the shields 12′ with a web 30 shown in the form of a corrugated lacing strip. The web 30 is sufficiently resilient to permit the shields 12′ to also flex within predetermined limits.

The step construction of connectors 16 provides means for mating adjacent panels and form a seal which prevents "straight-thru" heat transfer, by convection or conduction. Such construction also permits mating steps to slide upon each other when the panels are subject to increased temperatures and/or pressures within the dimension defined by the width of the steps without disrupting the overall insulating effect.

Figure 1:
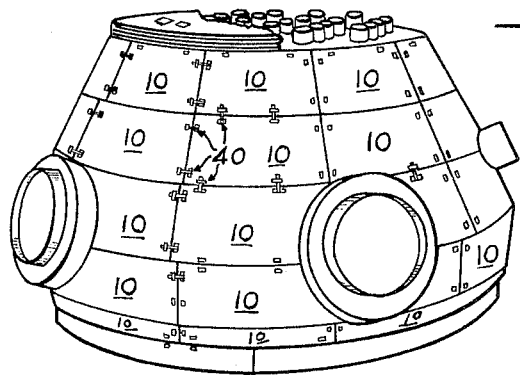
FIG. 1 is a pictorial view of a mock-up panel construction for a thermal reactor system embodying the panel of this invention.

To further accommodate expansion and contraction in an installation for which the mock-up construction illustrated in FIG. 1 is particularly adapted, the panels are preferably provided with expansible fastening means generally indicated by the numeral 40. A loop member 42 is secured to a shield 12′ of one of two adjacent panel ends and a corresponding loop member 42 is attached to the other of two adjacent panel ends. A band 44 is secured to one of the loop members 42. Preferably, the band 44 is doubled back upon itself after threading through member 42 to form a loop 46 which has an opening greater than the thickness of loop member 42 to facilitate relative movement therebetween. The opposing ends of band 44 are then threaded through the other corresponding loop member 42. The threaded free ends 48 are then curled or rolled back upon themselves, preferably with the initial turn downwardly toward the panel, to form a protuberance in the form of a coil 46 having a diameter greater than the opening of the loop member 42 to restrict linear movement of the band through member 42. By curling the band in the indicated direction, the uncurled portion is tensionally braced against loop member 42 and the coil defines a resilient spring-like securing means. Such securing means facilitate removal and replacement of any panel which may be rendered defective in service. It also provides an arrangement wherein the several panels are structurally tied together to impart greater strength than each might individually have. However, the resiliency of the securing means permits limited relative movement so that the individual panels may expand and contract in response to thermal and pressure changes and yet retain their relative positions in a particular installation, such as disclosed in FIG. 1.

The step construction of the panel ends defines tortuous heat transfer paths and thus deters heat transfer whether it be by convection or conduction. The shields themselves deter radiant heat transfer, yet a construction is provided which does not obviate the passage of flushing fluids employed in connection with thermal reactors. The all-metallic construction also obviates ablation and other erosive deterioration.

The insulating qualities of the panels of this invention may be further enhanced by employing two or more layers of panels and positioning the joints of one layer in staggered relation to the adjacent layer(s) in the manner illustrated in FIG. 6. Should any heat be transferred through the joint of one layer of panels, further transfer through the panels or the joints of an adjacent layer will be drastically curtailed.

In FIG. 6 is also illustrated the manner in which the shields 12 may be provided with an offset or step portion 13 in order to position the shields 12 in a single plane extending from one connector 16 of a panel 10 to the other connector 16′ of the same panel and all of the shields 12 in parallel alignment with each other.

FIG. 7 illustrates an embodiment of this invention which is particularly adapted for use with a cylindrical wall such as that of a pipe. In panel units for such application it is apparent that the shields 12 must be increased in length, according to their position to be assumed in the series of concentric circles formed, to compensate for the difference in circumferential length. In the embodiment shown, a single panel 10 circumposes the entire periphery of pipe 50 and is held in position by a strap band 44′ wrapped around the panel 10. One end of the band 44′ is shown to be affixed to loop member 42′, which need not be secured to the panel 10, and the opposite end of the band 44' is threaded through the same loop member 42' and coiled in the same manner as illustrated in FIG. 3. It will be understood that a plurality of panel members 10 may be employed to form a single panel layer around a pipe; particularly when pipes of increased diameters are to be insulated. It will also be understood that such panel construction may be employed on the interior side of pipes or other conduits.

In FIG. 3A, an alternate method of securing the strap 44 to a loop member 42 is disclosed. The band 44 is threaded through a loop member 42 and doubled back sufficiently to define loop 46.

It is also within the contemplation of this invention to optionally provide horizontal baffle plates or partition members between vertically adjacent panels to prevent straight-thru convection flow from one panel to another in those installations where in situ flushing is not of prime importance.

Although certain and specific embodiments of the invention have been shown and described, many modifications thereof are possible. Therefore, this invention is not to be restricted except as necessitated by the prior art and by the spirit of the appended claims.

What we claim:
1. A thermal insulating system comprising:
   (a) a plurality of panel units forming a layer,
   (b) each of said units comprising a plurality of heat reflective metallic spaced apart shields,
   (c) joined together by a pair of connectors, one at each of two opposing peripheral sides of said unit, to render each of said shields taut,
   (d) each of said shields being sufficiently flexible to respond to thermal and pressure changes to be encountered without rupture,
   (e) said connectors being of step formation,
   (f) the peripheral sides of said shields being joined to the steps of said formation, and said shields being spaced apart from each other by the steps of said step formation,
   (g) the corresponding and mating steps of adjacent panel units slidably engaging each other and providing a series of laterally staggered seals; and
   (h) fastening means yieldingly interconnecting adjacent units to each other.
2. A thermal insulating wall covering comprising:
   (a) a plurality of separate panels of metal having a coefficient of thermal expansion differing appreciably from that of the wall to be insulated;
   (b) each of said panels comprising a plurality of heat reflective metallic sheets arranged in generally parallel relation, one to another, and to said wall;
   (c) said panels horizontally adjacent to each other having adjacent ends of step formation which correspondingly and opposingly mate with each other in step joint relation,
   (d) the sheets within each of said panels being spaced apart from each other by the steps of said step formation,
   (e) the length of the steps in said step formation extending in a generally vertical direction and laterally away from said wall,
   (f) and flexible fastening means for interconnecting adjacent panels to each other.
3. A thermal insulating covering for a cylindrical wall comprising:
   (a) a panel comprising a plurality of metallic shields having heat reflective surfaces and adapted to be arranged in generally concentric relation, one to another; and
   (b) a metal connector at opposing ends of said panel, each of the connectors having a step formation with the steps of one connector opposing and correspondingly mating with the steps of the other when said panel is positioned about the wall to be insulated, and
   (c) the shields within said panel being spaced apart from each other by the steps of said step formation.
4. A thermal insulating panel comprising:
   (a) a plurality of metallic shields having heat reflective surfaces and being arranged in generally parallel relation, one to another, the reflectivity of said surfaces being in the order of .5–1.0; and
   (b) a metal connector of corresponding step formation and having a peripheral side of each of said shields secured to a step of said formation to form an integral unit and with the shields being spaced from each other by said connector,
   (c) at least one corresponding edge of each successive shield being in step formation with an adjacent shield.
5. A thermal insulating panel comprising:
   (a) a plurality of metallic shields having heat reflective surfaces and being arranged in generally parallel relation, one to another;
   (b) a metal connector of corresponding step formation and having a peripheral side of each of said shields secured to a step of said formation to form an integral unit and with the shields being spaced from each other by said connector; and
   (c) additional spacing means intermediate each pair of adjacent shields, said additional spacing means being resiliently responsive to pressure and thermal changes.

References Cited by the Examiner
UNITED STATES PATENTS

| 522,105 | 6/1894 | Canda | 52—407 |
| 1,611,317 | 12/1926 | Overton | 126—114 |
| 1,661,254 | 3/1928 | Gillies | 154—44 |
| 2,180,373 | 11/1939 | Sibley et al. | 52—407 |
| 2,430,275 | 11/1947 | Callan | 138—147 X |
| 3,045,293 | 7/1962 | Potchen | 52—309 |

FOREIGN PATENTS

| 525,429 | 3/1955 | Italy. |

FRANK L. ABBOTT, *Primary Examiner.*

RICHARD W. COOKE, JR., JACOB L. NACKENOFF, *Examiners.*